(12) United States Patent
Ishikawa (10) Patent No.: US 11,480,843 B2
(45) Date of Patent: Oct. 25, 2022

(54) OPTICAL TRANSMITTER, METHOD FOR CONTROLLING THE SAME, AND NON-TRANSITORY COMPUTER-READABLE MEDIUM

(71) Applicant: SUMITOMO ELECTRIC INDUSTRIES, LTD., Osaka (JP)

(72) Inventor: Tsutomu Ishikawa, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/307,735

(22) Filed: May 4, 2021

(65) Prior Publication Data

US 2021/0364878 A1    Nov. 25, 2021

(30) Foreign Application Priority Data

May 20, 2020   (JP) .............................. JP2020-088192

(51) Int. Cl.
G02F 1/21       (2006.01)
G02F 1/225      (2006.01)

(52) U.S. Cl.
CPC .............. G02F 1/212 (2021.01); G02F 1/225 (2013.01)

(58) Field of Classification Search
CPC ........ G02F 1/212; G02F 1/225; G02F 1/0123; G02F 1/2257; H04B 10/505
See application file for complete search history.

(56) References Cited

U.S. PATENT DOCUMENTS

| | | | |
|---|---|---|---|
| 5,170,274 A * | 12/1992 | Kuwata ................ | H04B 10/572 398/198 |
| 9,735,884 B2 * | 8/2017 | Goebuchi ............. | G02F 1/0123 |
| 2014/0241659 A1 | 8/2014 | Fukuda | |
| 2016/0156418 A1 | 6/2016 | Yamanaka | |

FOREIGN PATENT DOCUMENTS

| | | |
|---|---|---|
| JP | 2014-164263 | 9/2014 |
| JP | 2016-111398 | 6/2016 |

* cited by examiner

*Primary Examiner* — John Bedtelyon
(74) *Attorney, Agent, or Firm* — Smith, Gambrell & Russell, LLP.

(57) ABSTRACT

An optical transmitter includes a Mach-Zehnder modulator having an arm waveguide and a phase controller configured to control a phase of a light propagating through the arm waveguide by applying a voltage to the Mach-Zehnder modulator. When the voltage is deviated from a predetermined range, the phase controller shifts the voltage in the direction opposite to a direction of the deviation from the predetermined range by the amount corresponding to a change of $2\pi$ in the phase.

7 Claims, 8 Drawing Sheets

OPTICAL TRANSMITTER, METHOD FOR CONTROLLING THE SAME, AND NON-TRANSITORY COMPUTER-READABLE MEDIUM

CROSS-REFERENCE TO RELATED APPLICATION

This application claims priority based on Japanese Patent Application No. 2020-088192 filed on May 20, 2020, and the entire contents of the Japanese patent application are incorporated herein by reference.

FIELD OF THE INVENTION

The present disclosure relates to an optical transmitter, a method for controlling the same, and a non-transitory computer-readable medium.

BACKGROUND ART

A light-modulating Mach-Zehnder modulator formed of semiconductor layers has been developed (Japanese Patent Laid-Open No. 2014-164243 and Japanese Patent Laid-Open No. 2016-111398).

SUMMARY OF THE INVENTION

An optical transmitter according to the present disclosure includes a Mach-Zehnder modulator having an arm waveguide and a phase controller configured to control a phase of a light propagating through the arm waveguide by applying a voltage to the Mach-Zehnder modulator. In this optical transmitter, when the voltage is deviated from a predetermined range, the phase controller shifts the voltage in the direction opposite to a direction of the deviation from the predetermined range by the amount corresponding to a change of $2\pi$ in the phase.

A method for controlling an optical transmitter according to the present disclosure includes the steps of controlling a phase of a light propagating through an arm waveguide by applying a voltage to a Mach-Zehnder modulator having the arm waveguide, and when the voltage is deviated from a predetermined range, shifting the voltage in the direction opposite to a direction of the deviation from the predetermined range by the amount corresponding to a change of $2\pi$ in the phase.

A non-transitory computer-readable medium according to an embodiment of the present disclosure has stored therein a program for causing a computer to execute a process. The process includes controlling a phase of a light propagating through an arm waveguide by applying a voltage to a Mach-Zehnder modulator having the arm waveguide, and when the voltage is deviated from a predetermined range, shifting the voltage in the direction opposite to a direction of the deviation from the predetermined range by the amount corresponding to a change of $2\pi$ in the phase.

DESCRIPTION OF EMBODIMENTS

A light propagates through an arm waveguide of a Mach-Zehnder modulator (MZ modulator). By applying a voltage to the Mach-Zehnder modulator, it is possible to control the phase of the light. The phase of the light in the Mach-Zehnder modulator may vary with stress, temperature and the like that are applied to the Mach-Zehnder modulator. The phase of the light is set to an optimum phase by controlling the voltage using an auto bias control (ABC). To widen an adjusting range of the phase by the auto bias control, the voltage applied to the Mach-Zehnder modulator may be increased. However, increasing the voltage may cause an increase in power consumption, an increase in optical loss, and an increase in size of optical modulators. An object of the present disclosure is to provide the optical transmitter, the control method for controlling the same, and the non-transitory computer-readable medium that are capable of suppressing an increase in a voltage for controlling a phase of light.

DESCRIPTION OF EMBODIMENTS OF THE PRESENT DISCLOSURE

First, the contents of embodiments according to the present disclosure will be listed and described.

(1) An embodiment of the present disclosure relates to an optical transmitter including a Mach-Zehnder modulator having an arm waveguide, and a phase controller configured to control a phase of a light propagating through the arm waveguide by applying a voltage to the Mach-Zehnder modulator. In this optical transmitter, when the voltage is deviated from a predetermined range, the phase controller shifts the voltage in the direction opposite to a direction of the deviation from the predetermined range by the amount corresponding to a change of $2\pi$ in the phase. The voltage falls within the predetermined range by shifting the voltage. As a result, it is possible to suppress an increase in the voltage for controlling the phase of the light.

(2) The Mach-Zehnder modulator may include the two arm waveguides, each of which has a first electrode. The phase controller may control a phase of the light by applying a third voltage that is the sum of a first voltage and a second voltage to one of the first electrodes, and applying a fourth voltage that is the difference between the first voltage and the second voltage to another of the first electrodes. When the second voltage is deviated from the predetermined range, the phase controller may shift the second voltage by the amount corresponding to the change of $2\pi$ in the phase of the light. Since it is sufficient to change the second voltage, the control is simple.

(3) The phase controller may adjust the phase difference between lights propagating through the two arm waveguides to $\pi$ or a value equivalent to $\pi$, or $0.5\pi$ or a value equivalent to 0.5π. By setting the phase difference of the lights to a value equivalent to π, the Mach-Zehnder modulator can be adjusted to be at an extinction point. By setting the phase difference of the lights to a value equivalent to 0.5π, the phases of the modulated lights can be orthogonalized.

(4) The predetermined range of the voltage is equal to or wider than the range corresponding to the range of the phase from −π to π, and equal to or narrower than the range corresponding to the range of the phase from −3π to 3π. The voltage after the shift approaches the median value of the predetermined range and falls within the predetermined range. Therefore, it is possible to suppress an increase in voltage.

(5) The optical transmitter may further incudes a shutter configured to block a light emitted from the Mach-Zehnder modulator, a shutter controller configured to control opening and closing of the shutter, and a modulation controller modulate the light propagating through the arm waveguide in the Mach-Zehnder modulator. The optical transmitter may have a first unit and a second unit, each of which includes the Mach-Zehnder modulator and the shutter. When the modulation controller modulates the light in the Mach-Zehnder modulator of the first unit of the plurality of units, and the voltage applied to the Mach-Zehnder modulator of the first unit by the phase controller is deviated from the predetermined range, the modulation controller may modulate the light in the Mach-Zehnder modulator of the second unit, and the phase controller may apply a voltage derived in the same manner as the voltage applied to the Mach-Zehnder modulator of the first unit to the Mach-Zehnder modulator of the second unit. After the phase controller applies the voltage to the Mach-Zehnder modulator of the second unit, the shutter controller may close the shutter of the first unit and open the shutter of the second unit. After the shutter of the first unit is closed, the phase controller may shift the voltage by the amount corresponding to the change of 2π in the phase of the light propagating through the Mach-Zehnder modulator of the first unit. By opening and closing each shutter, the unit for emitting a modulated light is switched. Since the disturbance of the modulated light is suppressed, the transmission error of an optical signal is unlikely to occur.

(6) A method for controlling the optical transmitter according to an embodiment of the present disclosure includes the steps of controlling a phase of a light propagating through an arm waveguide by applying a voltage to a Mach-Zehnder modulator having the arm waveguide, and when the voltage is deviated from a predetermined range, shifting the voltage in the direction opposite to a direction of the deviation from the predetermined range by the amount corresponding to a change of 2π in the phase. The voltage falls within the predetermined range by shifting the voltage. As a consequence, it is possible to suppress an increase in voltage.

(7) A non-transitory computer-readable medium according to an embodiment of the present disclosure has stored therein a program for causing a computer to execute a process. The process includes controlling a phase of a light propagating through an arm waveguide by applying a voltage to a Mach-Zehnder modulator having the arm waveguide, and when the voltage is deviated from a predetermined range, shifting the voltage in the direction opposite to a direction of the deviation from the predetermined range by the amount corresponding to a change of 2π in the phase. The voltage falls within the predetermined range by shifting the voltage. As a consequence, it is possible to suppress an increase in voltage.

DETAILS OF EMBODIMENTS OF THE PRESENT DISCLOSURE

Specific examples of an optical transmitter, a control method, and a control program thereof according to an embodiment of the present disclosure will be described with reference to the accompanying drawings.

First Embodiment (Optical Transmitter)

Figure 1A:
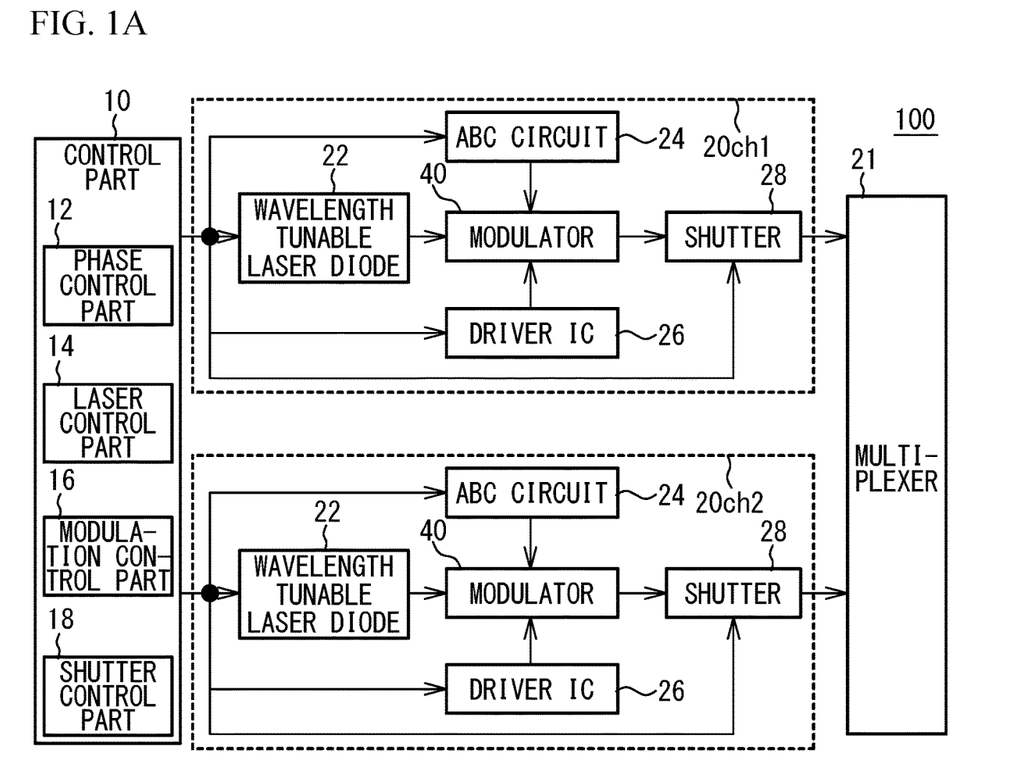
FIG. 1A is a block diagram illustrating an optical transmitter according to a first embodiment.

FIG. 1A is a block diagram illustrating an optical transmitter 100 according to the first embodiment. As illustrated in FIG. 1A, optical transmitter 100 includes a control part 10, two units 20*ch*1 and 20*ch*2, and a multiplexer 21.

Each of units 20*ch*1 and 20*ch*2 has a wavelength tunable laser diode 22, an auto bias control (ABC) circuit 24, a driver IC (integrated circuit) 26, a shutter 28, and a modulator 40.

Wavelength tunable laser diode 22 is, for example, a light-emitting device including a semiconductor laser diode or the like. ABC circuit 24 applies a voltage to modulator 40 for phase adjustment to perform an auto bias control. Driver IC 26 inputs a modulation signal to modulator 40. Modulator 40 modulates a light entering from wavelength tunable laser diode 22 and emits a modulated light. Shutter 28 is, for example, configured to be openable and closable, and blocks a light by closing, and allows the light to pass through by opening. Shutter 28 may be a semiconductor optical amplifier (SOA), for example. The SOA absorbs a light in a light absorption state, and allows the light to pass through in a light transmission state.

Multiplexer 21 may output one of emitted lights from units 20*ch*1 and 20*ch*2 to the outside, or may multiplex the emitted lights from the two units to output a light to the outside of optical transmitter 100 as a wavelength-multiplexed modulation light. The light emitted from multiplexer 21 enters an optical fiber (not illustrated), for example.

Units 20*ch*1 and 20*ch*2 operate independently of each other. For example, one of units 20*ch*1 and 20*ch*2 may modulate a light, and the other may not modulate the light. Both units 20*ch*1 and 20*ch*2 may modulate lights. In units 20*ch*1 and 20*ch*2, wavelengths of lights, modulation signals, phases of lights, and the like can be the same or different from each other. In the following examples, unit 20*ch*1 is a unit that operates at normal time, and unit 20*ch*2 is for back-up.

Control part 10 includes a computer such as a personal computer (PC), for example, and controls units 20*ch*1 and 20*ch*2.

Figure 1B:
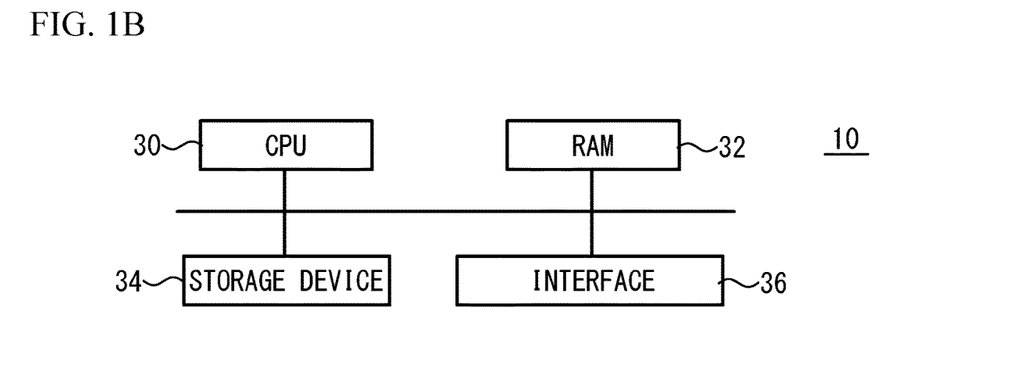
FIG. 1B is a block diagram illustrating a hardware configuration of a control part.

FIG. 1B is a block diagram illustrating a hardware configuration of control part 10. As illustrated in FIG. 1B, control part 10 includes a CPU30, a RAM32, a storage device 34, and an interface 36. CPU30, RAM32, storage device 34 and interface 36 are connected to each other with a bus or the like. RAM32 is a volatile memory for temporarily storing programs and data. Storage device 34 may include, for example, a ROM, a solid state drive (SSD) such as a flash memory, a hard disc drive (HDD), and the like. Storage device 34 stores programs for executing processes to be described later.

CPU30 executes the programs stored in RAM32 to realize a phase control part 12, a laser control part 14, a modulation control part 16, and a shutter control part 18 in control part 10 as illustrated in FIG. 1A. Phase control part 12 controls ABC circuit 24. ABC circuit 24 obtains the voltage applied to modulator 40. Laser control part 14 controls wavelength tunable laser diode 22. Modulation control part 16 controls driver IC 26. Shutter control part 18 controls shutter 28. Each part of control part 10 may be a hardware such as a circuit.

(Modulator)

Figure 2A:
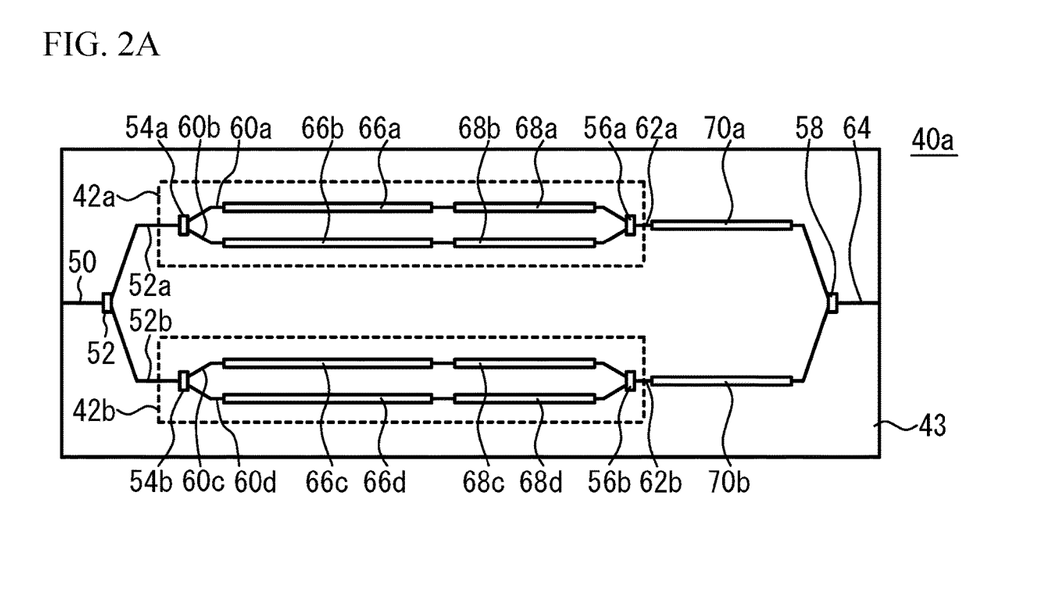
FIG. 2A is a plan view illustrating a modulator.
Figure 2B:
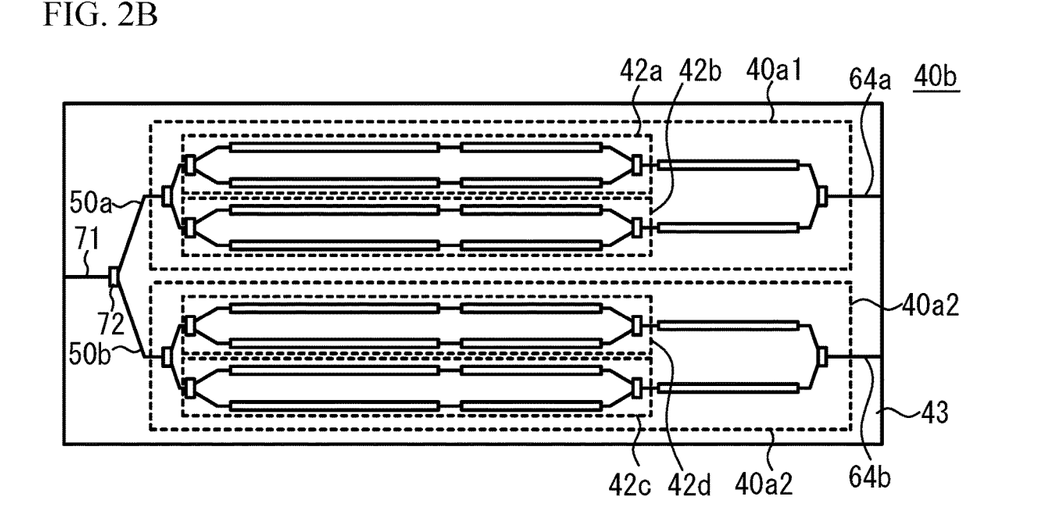
FIG. 2B is a plan view illustrating a modulator.

As modulator 40 in units 20ch1 and 20ch2 in FIG. 1A, a modulator 40a illustrated in FIG. 2A and a modulator 40b illustrated in FIG. 2B may be used.

FIG. 2A is a plan view illustrating modulator 40a. Modulator 40a is an IQ (In-phase Quadrature) modulator and is a main Mach-Zehnder modulator with two sub Mach-Zehnder modulators 42a and 42b. Sub Mach-Zehnder modulator 42a generates a modulated light of one (e.g., I channel) of the I and Q channels. Sub Mach-Zehnder modulator 42b generates a modulated light of the other (e.g., Q channel) of the I and Q channels. The phase of light is adjusted so that the phase of the modulated light of sub Mach-Zehnder modulator 42a is perpendicular to the phase of the modulated light of sub Mach-Zehnder modulator 42b.

Modulator 40a has a substrate 43, an input waveguide 50, arm waveguides 52a, 52b, 60a to 60d, 62a and 62b, an output waveguide 64, couplers 52, 54a, 54b, 56a, 56b, and 58, and electrodes 66a to 66d, 68a to 68d, 70a and 70b.

Sub Mach-Zehnder modulator 42a includes arm waveguides 52a, 60a, 60b and 62a, couplers 54a and 56a, and electrodes 66a, 66b, 68a and 68b. Sub Mach-Zehnder modulator 42b includes arm waveguides 52b, 60c, 60d and 62b, couplers 54b and 56b, and electrodes 66c, 66d, 68c and 68d. Sub Mach-Zehnder modulators 42a and 42b are arranged in parallel with each other between couplers 52 and 58. Arm waveguides 60a and 60c are p-side waveguides. Arm waveguides 60b and 60d are n-side waveguides.

Substrate 43 is a semiconductor substrate formed of semiconductors such as indium phosphide (InP). Input waveguide 50, output waveguide 64, arm waveguides and couplers are formed on substrate 43. Couplers 52, 54a, 54b, 56a, 56b, and 58 are 1×2 couplers. The electrodes are formed of a metal. Electrodes 66a to 66c are optical modulation electrodes used to modulate a light. Electrodes 68a to 68d, 70a, and 70b are phase adjustment electrodes used to adjust the phase of a light.

One end of input waveguide 50 is located on one end face of substrate 43, and the other end is connected to an input end of coupler 52. One end of arm waveguide 52a is connected to one of two output ends of coupler 52, and one end of arm waveguide 52b is connected to the other of the two output ends of coupler 52.

The other end of arm waveguide 52a is connected to an input end of coupler 54a. One ends of arm waveguides 60a and 60b are each connected to two output ends of coupler 54a. The other ends of arm waveguides 60a and 60b are each connected to two input ends of coupler 56a. Arm waveguides 60a and 60b extend in parallel with each other between couplers 54a and coupler 56a. Electrodes 66a and 68a are provided on arm waveguide 60a, and are arranged in this order between coupler 54a and coupler 56a. Electrodes 66b and 68b are provided on arm waveguide 60b, and are arranged in this order between coupler 54a and coupler 56a.

The other end of arm waveguide 52b is connected to an input end of coupler 54b. One ends of arm waveguides 60c and 60d are each connected to two output ends of coupler 54b. The other ends of arm waveguides 60c and 60d are each connected to two input ends of coupler 56b. Arm waveguides 60c and 60d extend in parallel with each other between couplers 54b and 56b. Electrodes 66c and 68c are provided on arm waveguide 60c, and are arranged in this order between coupler 54b and coupler 56b. Electrodes 66d and 68d are provided on arm waveguide 60d, and are arranged in this order between coupler 54b to coupler 56b.

One end of arm waveguide 62a is connected to an output end of coupler 56a. One end of arm waveguide 62b is connected to an output end of coupler 56b. The other ends of arm waveguides 62a and 62b are each connected to two input ends of coupler 58. Arm waveguides 62a and 62b extend in parallel with each other between couplers 56a, 56b and coupler 58. Electrode 70a is provided on arm waveguide 62a. Electrode 70b is provided on arm waveguide 62b. One end of output waveguide 64 is connected to an output end of coupler 58, and the other end of output waveguide 64 is located on an end face of substrate 43 that is opposite to another end face of substrate 43 on which one end of input waveguide 50 is located.

Wavelength tunable laser diode 22 illustrated in FIG. 1A is connected to an input end (end portion of input waveguide 50) of modulator 40a in FIG. 2A. Shutter 28 illustrated in FIG. 1A is located so as to face an output end (end portion of output waveguide 64) of modulator 40a in FIG. 2A.

Laser control part 14 in control part 10 illustrated in FIG. 1A causes wavelength tunable laser diode 22 to emit a light. The light entering input waveguide 50 of modulator 40a illustrated in FIG. 2A branches into arm waveguides 52a and 52b at coupler 52. The light propagating through arm waveguide 52a branches into arm waveguides 60a and 60b at coupler 54a. The light propagating through arm waveguide 52b branches into arm waveguides 60c and 60d at coupler 54b.

Upon inputting transmission data to control part 10 in FIG. 1A, modulation control part 16 in control part 10 generates a modulation signal based on the transmission data, and inputs the modulation signal to driver IC 26. By inputting the modulation signal from driver IC 26 to electrodes 66a to 66d, the refractive indexes of arm waveguides 60a to 60d are changed to modulate lights.

The modulated light propagating through arm waveguide 60a and the modulated light propagating through arm waveguide 60b are multiplexed at coupler 56a, and the multiplexed light propagates through arm waveguide 62a. The modulated light propagating through arm waveguide 60c and the modulated light propagating through arm waveguide 60d are multiplexed at coupler 56b, and the multiplexed light propagates through arm waveguide 62b. The modulated light propagating through arm waveguide 62a and the modulated light propagating through arm waveguide 62b are multiplexed at coupler 58, and the multiplexed light propagates through output waveguide 64. The modulated light is emitted from the end portion of output waveguide 64. When shutter 28 illustrated in FIG. 1A is opened, the modulated light is emitted from optical transmitter 100 through multiplexer 21. When shutter 28 is closed, the modulated light is blocked by shutter 28, so that the modulated light is not output from optical transmitter 100.

FIG. 2B is a plan view illustrating modulator 40b. Modulator 40b is DP (Dual Polarization)—IQ modulator with two modulators 40a1 and 40a2. Modulators 40a1 and 40a2 are the same IQ modulators as modulator 40a in FIG. 2A. Modulator 40a1 has sub Mach-Zehnder modulators 42a and 42b. Modulator 40a2 has sub Mach-Zehnder modulators 42c and 42d. The configurations of sub Mach-Zehnder modulators 42c and 42d are the same as those of sub Mach-Zehnder modulators 42a and 42b.

One end of input waveguide 71 is located on end face of substrate 43, and the other end of input waveguide 71 is connected to an input end of coupler 72. Input waveguide 50a of modulator 40a1 is connected to one of two output ends of coupler 72, and input waveguide 50b of modulator 40a2 is connected to the other of the two output ends of coupler 72. Output waveguide 64a of modulator 40a1 and output waveguide 64b of modulator 40a2 are located on the end face of substrate 43 that is opposed to another end face of substrate 43 on which input waveguide 71 is located.

Modulator 40a1 generates a modulated light of an X channel (X-polarized wave). Modulator 40a2 generates a modulated light of a Y channel (Y-polarized wave). The polarization plane of the X-polarized wave is perpendicular to the polarization plane of the Y-polarized wave. Multiplexer 21 illustrated in FIG. 1A multiplexes the modulated light of the X channel and the modulated light of the Y channel to output the multiplexed light. Hereinafter, modulator 40a illustrated in FIG. 2A is used as modulator 40 in FIG. 1A.

Phase control part 12 in control part 10 performs the auto bias control using ABC circuit 24. Specifically, phase control part 12 causes ABC circuit 24 to apply voltages to electrodes 68a to 68d and electrodes 70a and 70b in modulator 40a. The refractive indexes of the arm waveguides are changed by applying the voltages, and the phases of the lights are changed. Phase control part 12 can independently control the phase difference in the main Mach-Zehnder modulator (modulator 40a) and the phase differences in the sub Mach-Zehnder modulators 42a and 42b.

Phase control part 12 adjusts the phase difference between the light propagating through arm waveguide 62a and the light propagating through arm waveguide 62b to 0.5π (rad) or a value equivalent to 0.5π, for example. That is, in main Mach-Zehnder modulator, the phases of the lights are orthogonalized. The phase difference equivalent to 0.5π is a value at which the phases of lights are orthogonal, and is 0.5π±2π×n and 1.5π±2π×n (where, n is a negative or positive integer). The operating point of the main Mach-Zehnder modulator is defined as a state in which the phases of lights in the main Mach-Zehnder modulator are adjusted to be perpendicular to each other.

Phase control part 12 adjusts the phase difference between the light propagating through arm waveguide 60a and the light propagating through arm waveguide 60b to π (rad) or a value equivalent to π, for example. That is, in a state in which no modulation signals are applied, each of sub Mach-Zehnder modulators 42a and 42b is adjusted to be at the extinction point. The phase difference equivalent to π is a value to be the extinction point, and is π±2π×n (where n is a negative or positive integer). The operating point of the sub Mach-Zehnder modulator is defined as a state in which the sub Mach-Zehnder modulator is adjusted to be at the extinction point.

The voltage applied from ABC circuit 24 to modulator 40a will be described. A voltage VI (third voltage) applied to electrode 70a on arm waveguide 62a, and a voltage VQ (fourth voltage) applied to electrode 70b on arm waveguide 62b are expressed as follows, using a center voltage Vcp (first voltage) and a differential voltage Vdp (second voltage).

$$VI = Vcp + Vdp \quad (1)$$

$$VQ = Vcp - Vdp \quad (2)$$

A difference between the voltage VI and the voltage VQ is 2Vdp. Phase control part 12 changes the voltages VI and VQ to adjust the operating point of modulator 40a by fixing the center voltage Vcp to a constant value and changing the differential voltage Vdp.

The voltage applied to sub Mach-Zehnder modulator 42a from ABC circuit 24 will be described. A voltage Vp (third voltage) applied to electrode 68a on arm waveguide 60a, and a voltage Vn (fourth voltage) applied to electrode 68b on arm waveguide 60b are expressed as follows, using a center voltage Vcc (first voltage) and a differential voltage Vdc (second voltage)

$$Vp = Vcc + Vdc \quad (3)$$

$$Vn = Vcc - Vdc \quad (4)$$

A difference between the voltage Vp and the voltage Vn is 2Vdc. Phase control part 12 changes the voltages Vp and Vn to adjust the operating point of sub Mach-Zehnder modulator 42a by fixing the center voltage Vcc to a constant value and changing the differential voltage Vdc. The voltages Vp and Vn are also applied to sub Mach-Zehnder modulator 42b.

Figure 3:
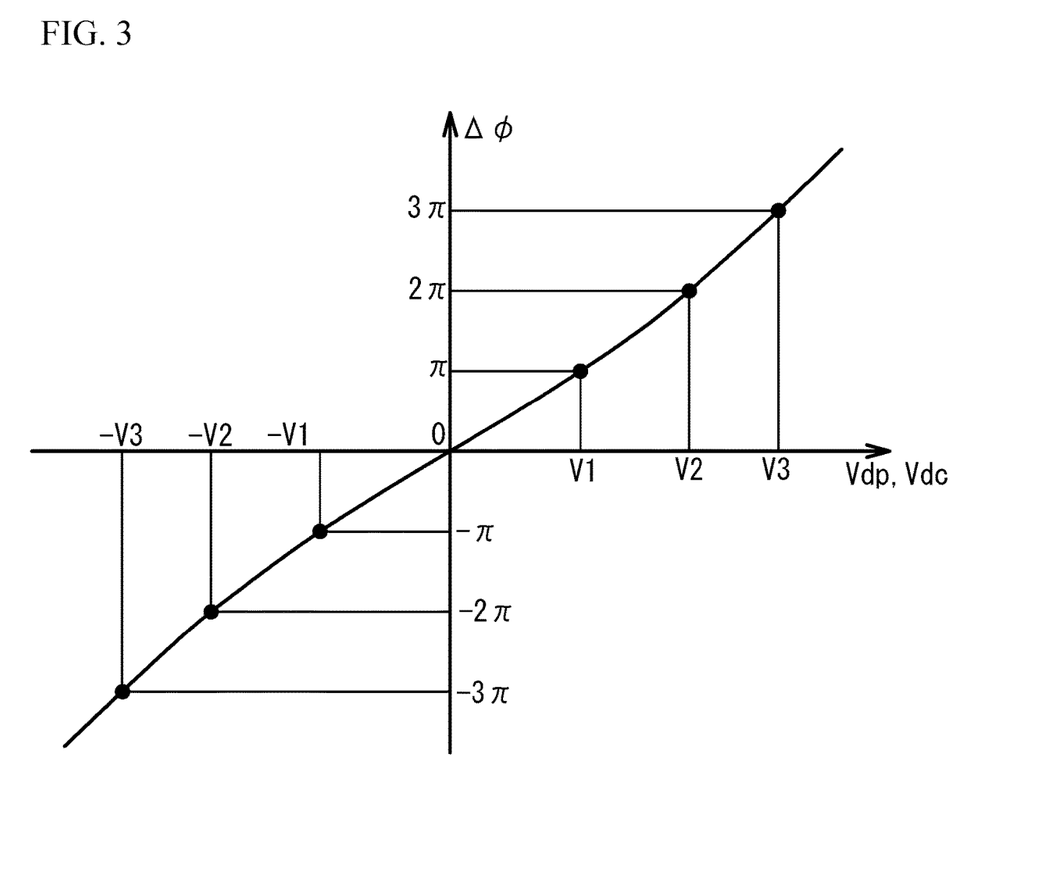
FIG. 3 is a diagram illustrating a relation between voltage and phase change amount (phase adjustment amount).

FIG. 3 is a diagram illustrating a relation between a voltage and a phase change amount (phase adjustment amount). A horizontal axis represents the differential voltage Vdp or Vdc, and a vertical axis represents a phase adjustment amount Δϕ. As illustrated in FIG. 3, the relation between the differential voltage and the phase adjustment amount Δϕ is nonlinear and of point symmetry with respect to the origin. If the differential voltage is zero, the phase adjustment amount Δϕ is also zero. When the differential voltage increases in the positive direction of the horizontal axis, the phase adjustment amount Δϕ also increases in the positive direction of the vertical axis. When the differential voltage increases in the negative direction of the horizontal axis, the phase adjustment amount Δϕ also increases in the negative direction of the vertical axis. For differential voltages V1, V2 and V3, the phase adjustment amounts Δϕ) are π, and 3π, respectively. For differential voltages −V1, −V2, and −V3, the phase adjustment amounts Δϕ are −π, −2π, and −3π, respectively.

A phase difference ϕ between the two arm waveguides is expressed as the sum of an initial phase difference ϕ0 and the phase adjustment amount Δϕ as in the following equation.

$$\phi = \phi 0 + \Delta\phi \quad (5)$$

The initial phase difference ϕ0 is determined by a difference in an optical path length between the arm waveguides of modulator 40a. The phase adjustment amount is an amount of change in phase due to the application of a voltage.

A wavelength λ of the light emitted from wavelength tunable laser diode 22 is 484 nm in the arm waveguide (1550 nm in vacuo), for example. On the other hand, the lengths of arm waveguides 60a and 60b of sub Mach-Zehnder modulator 42a, and the lengths of arm waveguide 60c and 60d of sub Mach-Zehnder modulator 42b are 6 mm, for example, which is equal to or more than 10000 times the wavelength λ. Variations in optical path length of the arm waveguides occur due to manufacturing errors and the like. The relation between a difference ΔL in optical path length of the two arm waveguides and the initial phase difference ϕ0 of the lights of the two arm waveguides is expressed by the following equation using an integer m.

$$\phi 0 + 2m\pi = 2\pi\Delta L/\lambda \quad (6)$$

For example, the difference ΔL in optical path length between the two arm waveguides forming a pair, such as arm waveguide 60a and arm waveguide 60b, may be equal to or more than one ten-thousandth of the designed dimension. Since the difference ΔL in optical path length is equal to or greater than the wavelength λ of the light, the initial phase difference φ0 is distributed in the range from 0 (rad) to a (rad).

During operation of optical transmitter 100, the optical path length of the arm waveguide may also change due to a stress and a thermal change in modulator 40. As the optical path length changes, the initial phase difference φ0 changes, and the phase difference φ also changes. Phase control part 12 performs auto bias control and adjusts the operating points by changing the voltages applied to electrodes 68a to 68d, 70a, and 70b in response to the variation of the phase difference φ.

Figure 4:
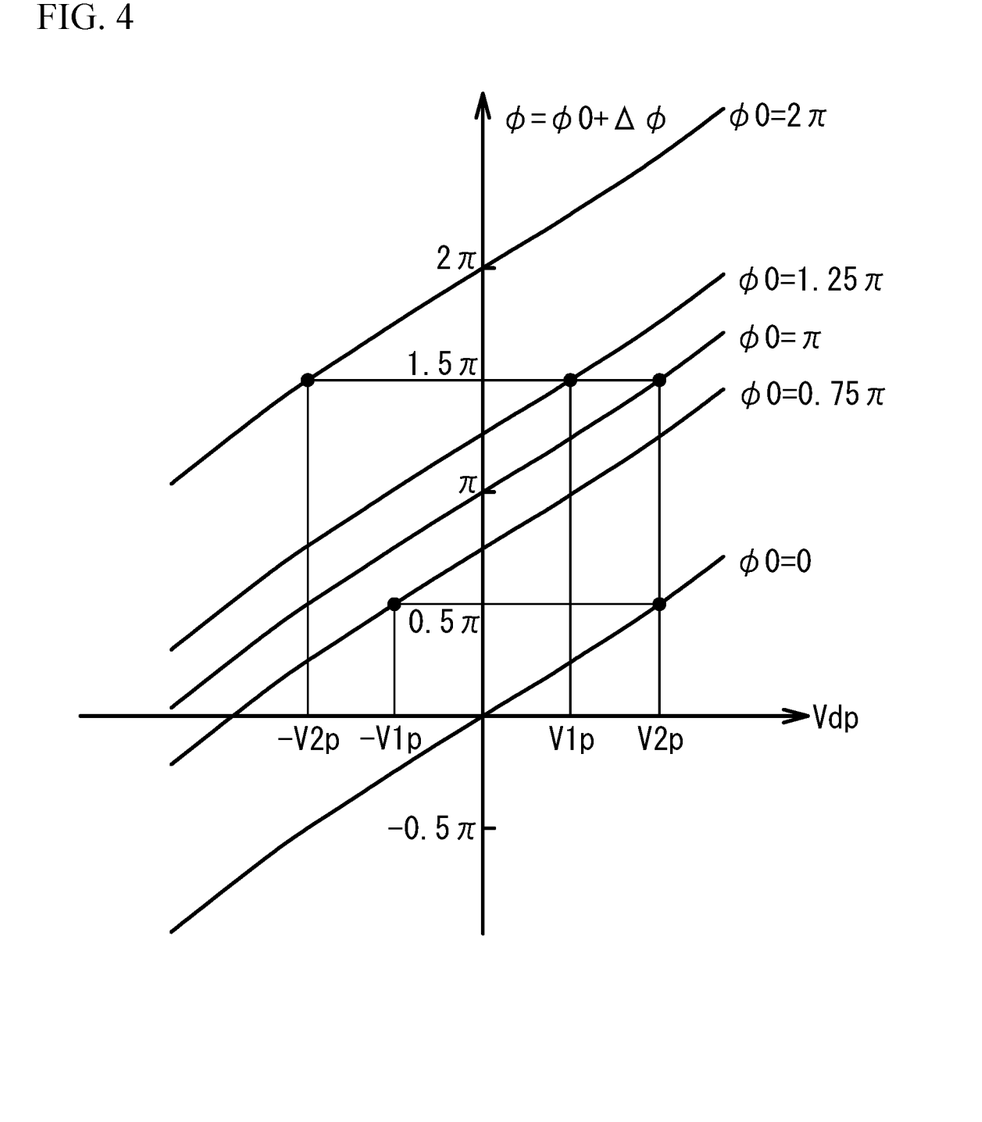
FIG. 4 is a diagram illustrating operating points of a main Mach-Zehnder modulator.

FIG. 4 is a diagram illustrating operating points of the main MZ modulator. A horizontal axis represents the differential voltage Vdp, and a vertical axis represents the phase difference φ. The plurality of solid lines indicate examples in which the initial phase differences φ0 are 2π, 1.25π, π, 0.75π, and 0 in this order from the top. A differential voltage V1p is 0.8 V, for example, and a differential voltage V2p is 1.5 V, for example.

When the initial phase difference φ0 is equal to zero, the phase adjustment amount Δφ may be 0.5π in order for the phase difference φ to be 0.5π. Phase control part 12 sets the differential voltage Vdp to V2p in order for the phase adjustment amount Δφ to be 0.5π, and adjusts the phase difference φ to 0.5π. When the initial phase difference φ0 is equal to 0.75π, the phase adjustment amount Δφ) may be 0.25π in order for the phase difference φ to be 0.5π. Phase control part 12 sets the differential voltage Vdp to −V1p. When the initial phase difference φ0 is equal to π, the phase adjustment amount Δφ may be 0.5π in order for the phase difference φ to be 1.5π. Phase control part 12 sets the differential voltage Vdp to V2p. When the initial phase difference φ0 is equal to 1.25π, the phase adjustment amount Δφ may be 0.25π in order for the phase difference φ to be 1.5π. Phase control part 12 sets the differential voltage Vdp to V1p. When the initial phase difference φ0 is equal to 2π, the phase adjustment amount Δφ may be 0.5π in order for the phase difference φ to be 1.5π. Phase control part 12 sets the differential voltage Vdp to −V2p.

Figure 5:
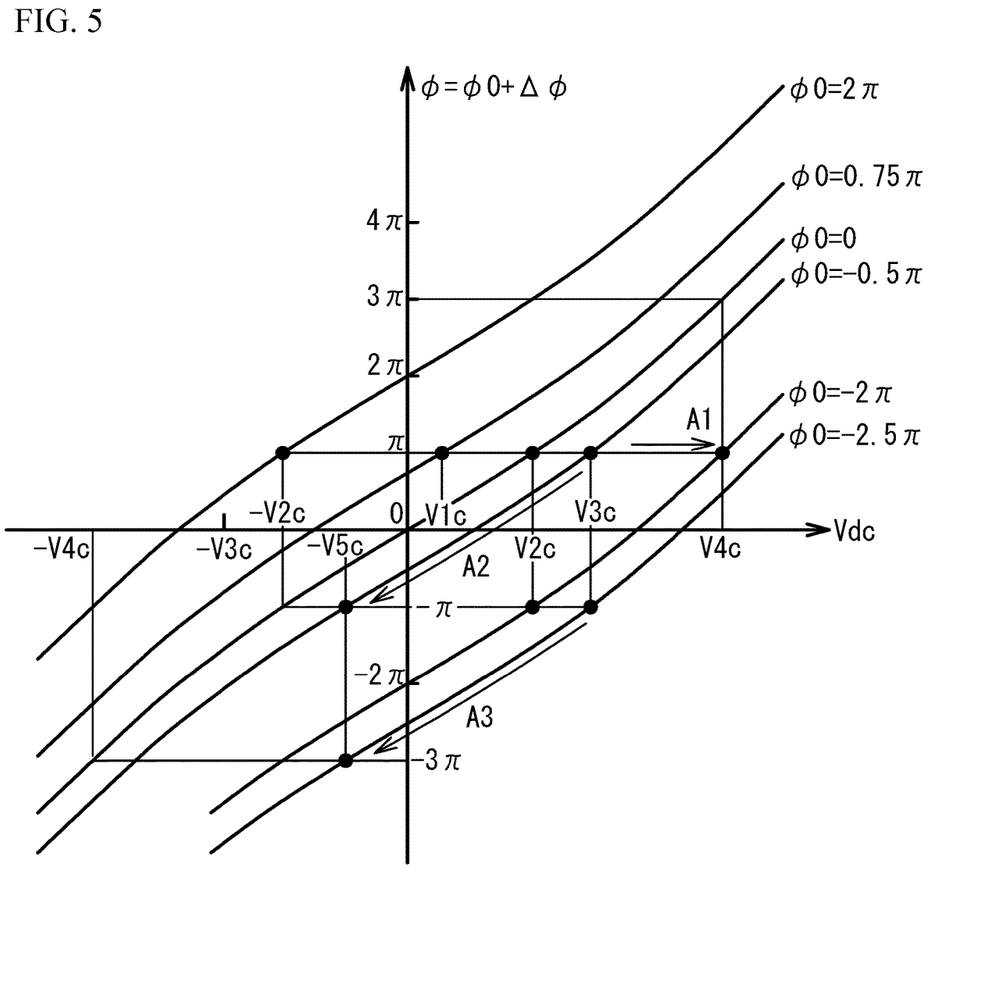
FIG. 5 is a diagram illustrating operating points of a sub Mach-Zehnder modulator.

FIG. 5 is a diagram illustrating operating points of the sub MZ modulator. A horizontal axis represents the differential voltage Vdc, and a vertical axis represents the phase difference φ. The plurality of solid lines indicate examples in which the initial phase differences φ0 are 2π, 0.75π, 0, −0.5π, −2π, and −2.5π in this order from the top. Examples of the voltages in FIG. 5 are as follows. A differential voltage V1c is 0.8V, a differential voltage V2c is 2.9V, a differential voltage V3c is 4.3V, a differential voltage V4c is 7.4V, and a differential voltage −V5c is −1.5V.

As illustrated in FIG. 5, when the initial phase difference φ0 is equal to zero, the phase adjustment amount Δφ may be π in order for the phase difference φ to be π. Phase control part 12 adjusts the phase adjustment amount Δφ to π for the phase difference φ to be π by setting the differential voltage Vdc to V2c. When the initial phase difference φ0 is equal to 0.75π, the phase adjustment amount Δφ may be 0.25π in order for the phase difference to be π Phase control part 12 sets the differential voltage Vdc to V1c. When the initial phase difference φ0 is equal to 2π, the phase adjustment amount Δφ may be −π in order for the phase difference φ to be π. Phase control part 12 sets the differential voltage Vdc to −V2c.

As described above, the initial phase difference φ0 may also change during operation of optical transmitter 100. Phase control part 12 adjusts the operating point by changing the differential voltage Vdc in response to the change of the initial phase difference φ0.

When the initial phase difference φ0 between the two arm waveguides of the sub Mach-Zehnder modulators (e.g., arm waveguides 60a and 60b of sub Mach-Zehnder modulator 42a) is 0.75π, as illustrated by the solid line of φ0=0.75π in FIG. 5, phase control part 12 sets the differential voltage Vdc to V1c. When the initial phase difference φ0 changes from 0.75π to zero during operation, phase control part 12 adjusts the phase adjustment amount Δφ to π for the phase differential φ to be π by setting the differential voltage Vdc to V2c. When the initial phase difference φ0 changes to −0.5π, phase control part 12 sets the differential voltage Vdc to V3c.

When the initial phase difference φ0 changes from −0.5π to −2π, for example, as illustrated by an arrow A1 in FIG. 5, a point of φ=π can be the operating point by setting the differential voltage Vdc to V4c larger than V3c. However, as the differential voltage Vdc becomes larger in the positive direction, the voltage Vp increases. Further, when the differential voltage Vdc becomes larger in the negative direction, the voltage Vn increases. That is, the increase in the absolute value of the differential voltage Vdc causes the voltages Vp and Vn for phase adjustment to become larger.

The increase in voltages Vp and Vn causes an increase in power consumption, an increase in optical loss in the arm waveguides, and the like. As the difference 2Vdc between Vp and Vn increases, a difference in optical loss between the arm waveguides increases, and an extinction ratio decreases. Stress can be suppressed by fixing modulator 40 to a firm package made of ceramics or the like. By using a Peltier element or the like, temperature change can be suppressed. However, the number of components increases, and the size and the cost of optical transmitter 100 increase.

Therefore, in the first embodiment, the differential voltage Vdc is in the range from −V3c to V3c (−V3c≤Vdc≤V3c), for example. When the differential voltage Vdc deviates from the range, the differential voltage Vdc is shifted by the amount corresponding to a phase change of 2π (hereinafter referred to as "2π-corresponding amount"). By shifting the differential voltage, the increases in the voltages Vp and Vn are suppressed.

In FIG. 5, when the initial phase difference φ0 changes from 0.5π to the negative direction, phase control part 12 does not change the differential voltage Vdc to a voltage higher than V3c, but shifts the differential voltage Vdc in a direction opposite to a direction of increasing the voltage by the amount corresponding to the change of 2π in phase. On the line of the initial phase difference φ0=−0.5π in FIG. 5, the differential voltage Vdc is changed from V3c to −V5c in response to changing the phase difference φ from π to −π by 2π. That is, as indicated by an arrow A2 in FIG. 5, the operating point shifts from π to −π. By setting the phase difference φ to −π, the sub Mach-Zehnder modulator is adjusted to be at the extinction point in a state where no modulation signals are applied. The voltage −V5c is greater than −V3c and less than zero, and in the range from −V3c to V3c. In other words, the absolute value of the differential voltage Vdc after the shift is smaller than the absolute value before the shift. This suppresses increases in the voltages Vp and Vn.

When the initial phase difference φ0 changes from −0.5π to 2π, for example, phase control part 12 changes the differential voltage Vdc from −V5c to V2c and maintains the operating point at −π. When the initial phase difference φ0 changes to −2.5π, for example, the differential voltage Vdc increases to V3c. Phase control part 12 then shifts the differential voltage Vdc in the direction opposite to the direction of increasing the voltage by the amount corresponding to the change of 2π in phase. As illustrated by an arrow A3 in FIG. 5, the differential voltage Vdc changes from V3c to −V5c, and is within the range from −V3c to V3c. The phase difference φ is 3π. In the examples illustrated by the arrows A2 and A3, when the differential voltage Vdc is larger than V3c, phase control part 12 shifts the differential voltage Vdc in the direction of decreasing the voltage by the amount corresponding to the change of 2π in phase. When the differential voltage Vdc is smaller than V3c, phase control part 12 shifts the differential voltage Vdc in the direction of increasing the voltage by the amount corresponding to the change of 2π in phase. In a state in which no modulation signals are applied, the sub Mach-Zehnder modulator is adjusted to be at the extinction point.

Figure 6:
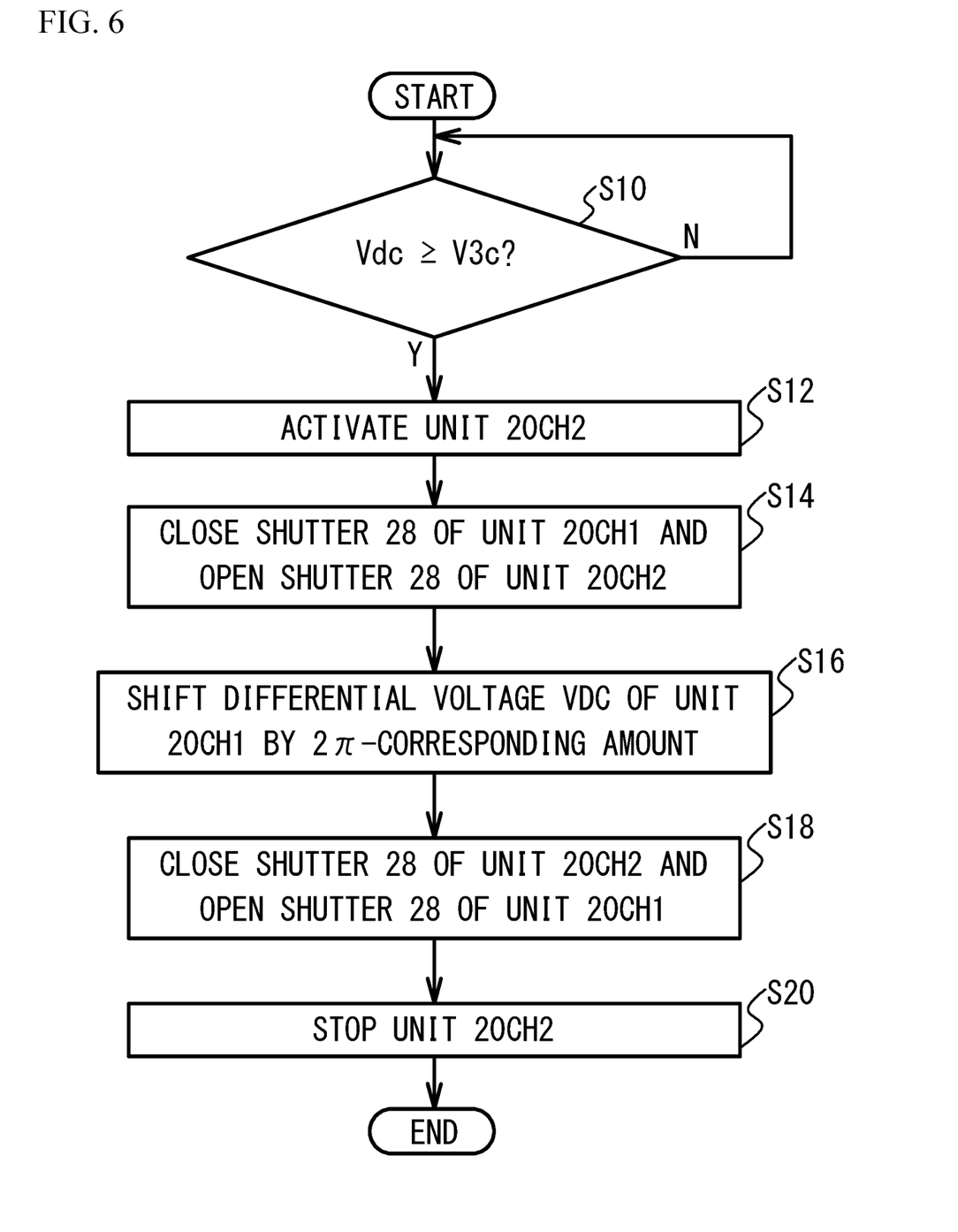
FIG. 6 is a flow chart illustrating processes executed by a control part.

FIG. 6 is a flow chart illustrating processes performed by control part 10, and illustrates the resetting of a voltage for a sub Mach-Zehnder modulator. At the beginning of the process, unit 20ch1 of optical transmitter 100 in FIG. 1A is in operation. Wavelength tunable laser diode 22 of unit 20ch1 emits a light. ABC circuit 24 of unit 20ch1 applies voltages to electrodes 68a to 68d, 70a and 70b to perform the auto bias control. Depending on the control of modulation control part 16, driver IC of unit 20ch1 applies voltages to electrodes 66a to 66d. Modulator 40a of unit 20ch1 generates the modulated light. Unit 20ch2 is not in operation. Shutter 28 of unit 20ch1 is open and shutter 28 of unit 20ch2 is closed. The modulated light of unit 20ch1 is emitted through multiplexer 21.

As illustrated in FIG. 6, phase control part 12 in control part 10 acquires the differential voltage Vdc applied to a sub Mach-Zehnder modulator as a monitor signal to determine whether or not the differential voltage Vdc is equal to or greater than V3c (step S10). If the determination result is NO, step S10 is repeated. If the determination result is Yes, control part 10 activates unit 20ch2 and operates unit 20ch2 under the same conditions as unit 20ch1 (step S12). In unit 20ch2, each of the wavelength and intensity of an emitted light of wavelength tunable laser diode 22, the voltages Vp, Vn, VI, and VQ applied by ABC circuit 24, and the voltages applied by driver IC 26 is equal to a corresponding one of unit 20ch1. Modulator 40 of unit 20ch2 generates the modulated light equivalent to that of modulator 40 of unit 20ch1. Since shutter 28 of unit 20ch2 is closed, the modulated light of unit 20ch2 is not emitted outside optical transmitter 100.

Shutter control part 18 in control part 10 closes shutter 28 of unit 20ch1 and opens shutter 28 of unit 20ch2 (step S14). The modulated light of unit 20ch1 is not emitted outside optical transmitter 100. On the other hand, the same modulated light as that of unit 20ch1 is emitted from unit 20ch2. Since the modulated light is emitted from optical transmitter 100 without interruption, the disturbance of the modulated light is unlikely to occur and transmission error is suppressed.

Phase control part 12 shifts the differential voltage Vdc of unit 20ch1 by the amount (2π-corresponding amount) that changes the phase by 2π (step S16). For example, as described in FIG. 5, when the initial phase difference φ0 of sub Mach-Zehnder modulator 42a of unit 20ch1 changes from −0.5π to −2π, phase control part 12 shifts the voltage from V3c to −V5c. Shutter control part 18 closes shutter 28 of unit 20ch2 and opens shutter 28 of unit 20ch1 (step S18). The modulated light of unit 20ch2 is not emitted outside optical transmitter 100, but the modulated light of unit 20ch1 is emitted. Thereafter, control part 10 stops the operation of unit 20ch2 (step S20) to terminate the process.

According to the first embodiment, upon the deviation of the differential voltage Vdc from the range of −V3c to V3c, phase control part 12 shifts the differential voltage Vdc by the amount corresponding to the phase change of 2π in a direction opposite to a direction of the deviation from the range. This shifting allows the differential voltage Vdc to fall within the range from −V3c to V3c. The absolute value of the differential voltage Vdc is reduced, and the increases in the voltages Vp and Vn are suppressed. This allows the power consumption to be suppressed, and also allows the optical loss in arm waveguides to be suppressed. Since the increase in the voltage difference 2Vdc between the arm waveguides is suppressed, the decrease in the extinction ratio is suppressed. It is unnecessary to add the firm package for fixing modulator 40, a temperature control element, and the like. This allows suppressing the number of components and the increases in the size and the cost of optical transmitter 100.

The shift amount of the differential voltage Vdc is the amount corresponding to the phase change of 2π (2π-corresponding amount). Therefore, the phase difference of the lights after the voltage shift is adjusted in order for the modulator to be at the operating point. As illustrated in FIG. 5, phase control part 12 controls the optical phase difference between the two arm waveguides of the sub Mach-Zehnder modulator to be π. The sub Mach-Zehnder modulator is adjusted to be at the extinction point by the auto bias control.

The voltage applied to each of phase adjustment electrodes 68a and 68c of the sub Mach-Zehnder modulator is a sum Vpc of the center voltage Vcc and the differential voltage Vdc. The voltage applied to each of phase adjustment electrodes 68b and 68d of the sub Mach-Zehnder modulator is a difference Vpn between the center voltage Vcc and the differential voltage Vdc. By changing the differential voltage Vdc, phase control part 12 can change the voltages Vpc and Vpn to adjust the phase. Phase control part 12 changes the differential voltage Vdc by the amount corresponding to the phase change of 2π. Since it is sufficient to adjust the differential voltage Vdc, the control is simple.

The first embodiment may be applied to a main Mach-Zehnder modulator. Phase control part 12 controls the phase difference of the lights between arm waveguide 62a and 62b illustrated in FIG. 2A to be 0.5π. Phase control part 12 can suppress the increase in Vdp by shifting the differential voltage Vdp by the amount corresponding to the phase change of 2π. The auto bias control maintains the phase difference at 0.5π, and the phases of the two modulated lights of the main Mach-Zehnder modulator are orthogonal. The adjustment of the phase of the light by phase control part 12 is not limited to the adjustment of the sub Mach-Zehnder modulator to be at the extinction point, and the adjustment of the phases to be orthogonal in the main Mach-Zehnder modulator.

It is preferable that the differential voltage after the shift of the 2π-corresponding amount is close to 0 V, which is a median value of the range of the differential voltage, as compared with that before the shift. For example, assuming that the range of the differential voltage is wider than the range (−V4c to V4c in FIG. 5) corresponding to the phase adjustment amount of −3π to 3π in the case of the curve of φ0=0 in FIG. 5, the Vdc does not fall within the range corresponding to the phase of −π to π even if the differential voltage Vdc is shifted by the 2π-corresponding amount. In addition, when the range of the differential voltage is narrower than the range (−V2c to V2c in FIG. 5) corresponding to the phase adjustment amount of −π to π, the shift of the differential voltage Vdc by the 2π-corresponding amount cause the differential voltage to be distant from the median value (0V), and the absolute value of the differential voltage increases than the absolute value before the shift.

The range of the differential voltage may have a median value of 0V, and may be equal to or wider than the range corresponding to the phase adjustment amount of −π to π, and equal to or narrower than the range corresponding to the phase adjustment amount of −3π to 3π. The differential voltage after the shift of the 2π-corresponding amount can be kept within a range corresponding to the range of the phase from −π to π, for example. Since the absolute value of the differential voltage after the shift becomes smaller than the absolute value before the shift, the increases in the voltages Vp and Vn are suppressed.

In the first embodiment, the voltages VI and VQ for the phase adjustment of the main Mach-Zehnder modulator are represented by the sum and the difference of the center voltage Vcp and the differential voltage Vdp, respectively. The voltages Vp and Vn for the phase adjustment of the sub Mach-Zehnder modulator are expressed by the sum and the difference of the center voltage Vcc and the differential voltage Vdc, respectively. The voltages for the phase adjustment may not include the center voltage and the differential voltage. Phase control part 12 may shift the voltages VI, VQ, Vp, and Vn for the phase adjustment by the 2π-corresponding amount.

Each of unit 20ch1 and 20ch2 has shutter 28. For example, unit 20ch1 is used for normal operation, and unit 20ch2 is used for back-up. Before phase control part 12 resets the voltage of unit 20ch1, the same voltage as that of unit 20ch1 is applied to unit 20ch2 (step S12 in FIG. 6). Modulation control part 16 modulates the light in unit 20ch2 in the same manner as unit 20ch1. Shutter control part 18 opens shutter 28 of unit 20ch2 in synchronization with closing shutter 28 of unit 20ch1 (step S14). The modulated light is emitted from unit 20ch2 and no modulated light is emitted from unit 20ch1 that is under reset. The disturbance of the modulated light is suppressed, and transmission error of the optical signal is unlikely to occur.

For example, the transmission rate may be 11 Gb/s, and a buffer interval of 1 Mbit may be set for each 10-Mbit data transmission. A buffer interval of about 100 μs may be obtained every 1 ms. Switching the unit during the buffer interval allows transmitting data without transmission error.

After resetting the voltage in unit 20ch1, shutter 28 of unit 20ch1 may remain closed, and unit 20ch2 may continue operating to emit a light from unit 20ch2. Unit 20ch1 may be used for back-up and unit 20ch2 may be used for normal operation.

Second Embodiment

Figure 7:
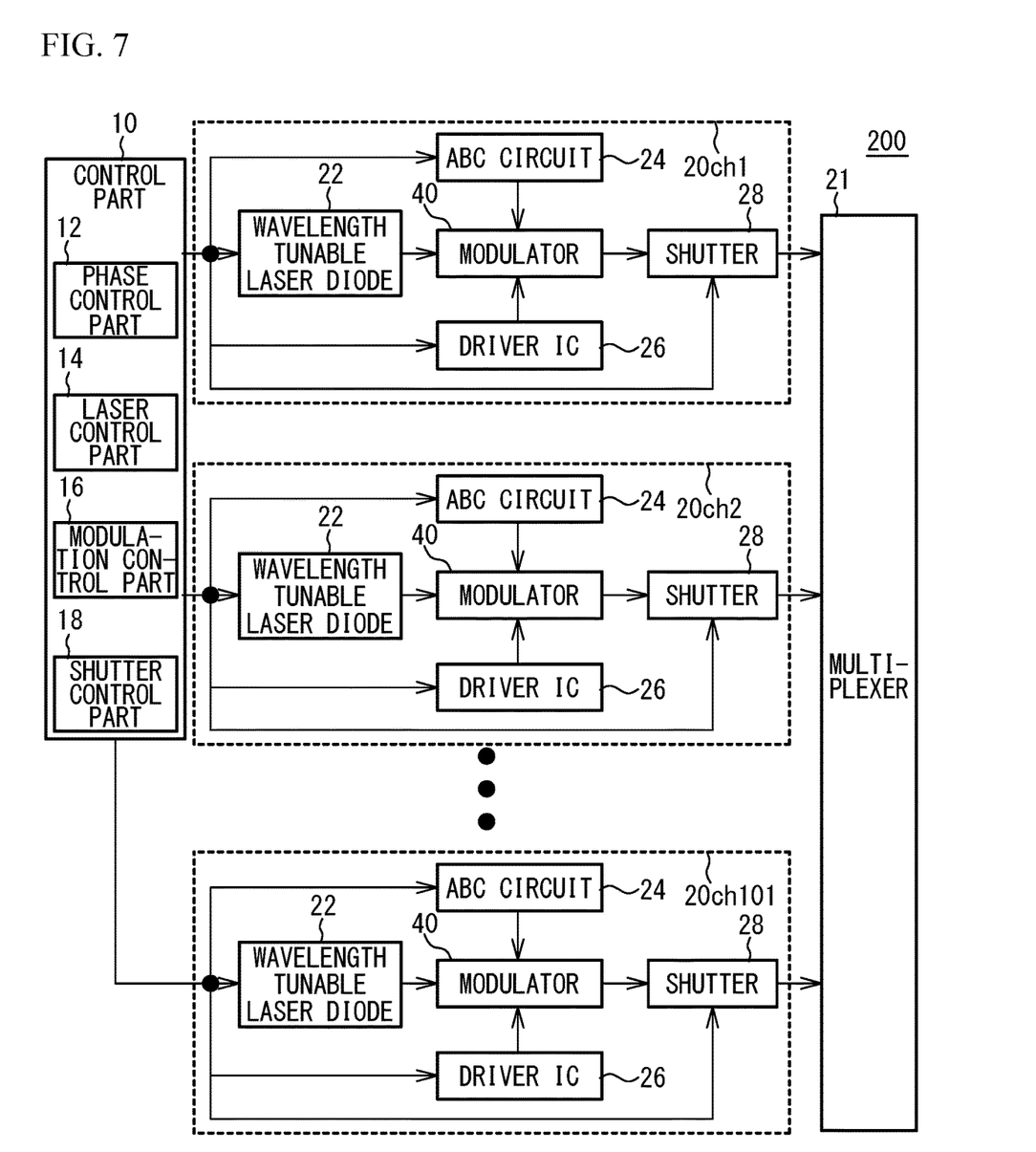
FIG. 7 is a block diagram illustrating an optical transmitter according to a second embodiment.

FIG. 7 is a block diagram illustrating an optical transmitter 200 according to the second embodiment. Description of the same configuration as that of the first embodiment will be omitted. Optical transmitter 200 has 101 units from unit 20ch1 to 20ch101. Every units have the same configuration. One hundred units (e.g., units 20ch1 to 20ch100) are for normal operation and one unit (e.g., unit 20ch101) is for backup.

Figure 8:
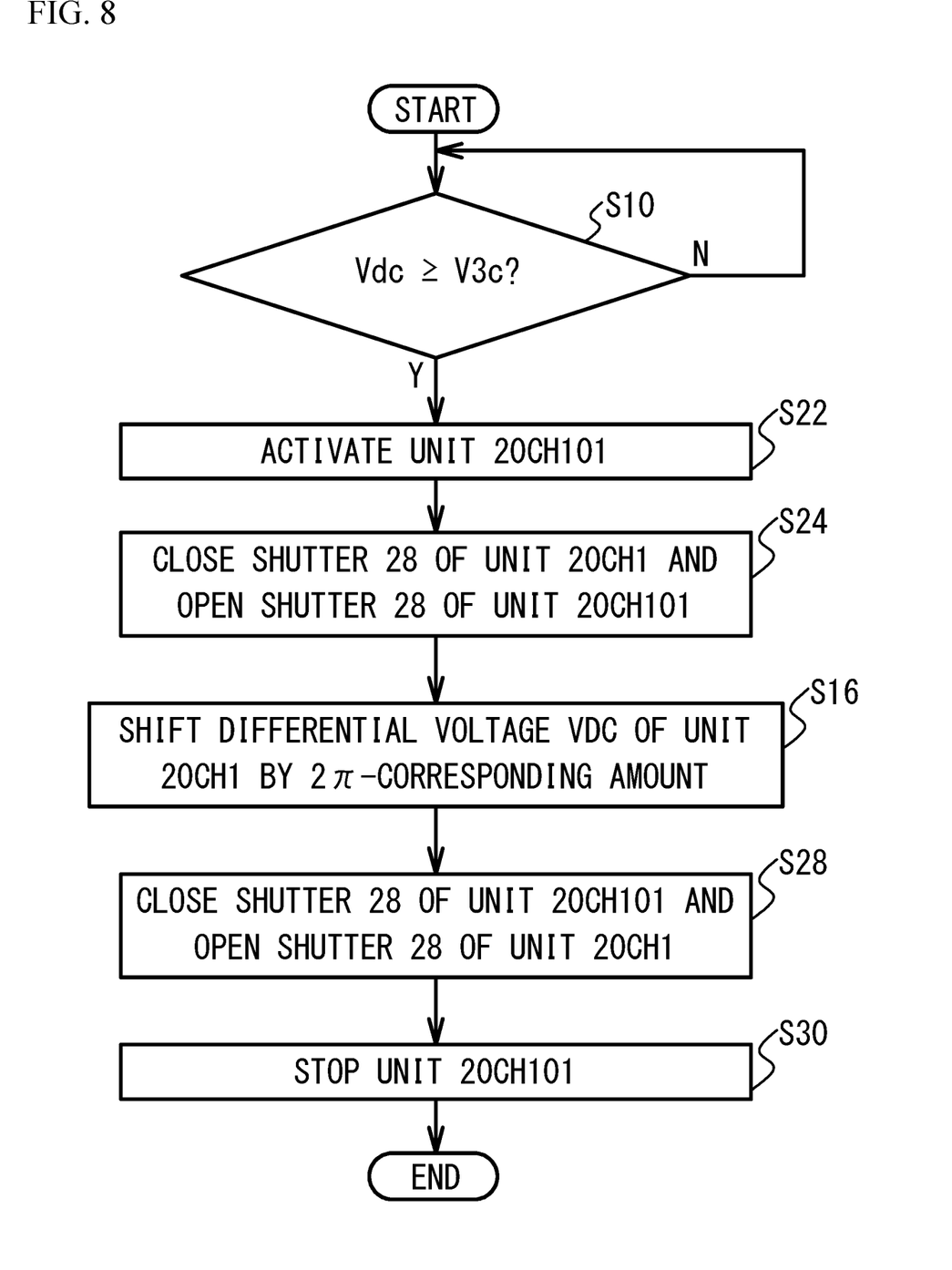
FIG. 8 is a flow chart illustrating processes executed by a control part.

FIG. 8 is a flow chart illustrating processes performed by control part 10, and illustrates the resetting of the voltage of the sub Mach-Zehnder modulator. If the differential voltage Vdc is equal to or greater than V3c in any one (e.g., unit 20ch1) of units 20ch1 to 20ch100 (step S10), control part 10 activates unit 20ch101 (step S22). Shutter control part 18 closes shutter 28 of unit 20ch1 and opens shutter 28 of unit 20ch101 (step S24). After phase control part 12 shifts the differential voltage Vdc of unit 20ch1 by the 2π-corresponding amount (step S16), shutter control part 18 closes shutter 28 of unit 20ch101 and opens shutter 28 of unit 20ch1 (step S28). Thereafter, control part 10 stops the operation of unit 20ch101 (step S30).

According to the second embodiment, similarly to the first embodiment, the increases in the voltages Vp and Vn are suppressed by setting the differential voltage Vdc within the range from V3c to V3c. One hundred units 20ch1 to 20ch100 are for normal operation, and one unit 20ch101 is for backup. Since the backup unit is only one for 100 channels of transmission capacity, the cost of optical transmitter 200 is reduced. The number of units for normal operation may be 100 or less, or 100 or more. The number of backup units may be one or more. The higher the ratio of the number of units for normal operation to the number of units for backup, the lower the cost.

The embodiments of the present disclosure have been described above. However, the embodiments of the present disclosure disclosed above are only illustrative, and the scope of the present invention is not limited to the specific embodiments of the disclosure. It is to be understood that the scope of the present invention is defined in the appended claims and includes equivalence of the description of the claims and all changes within the scope of the claims.

What is claimed is:

1. An optical transmitter comprising:
    a Mach-Zehnder modulator having an arm waveguide; and
    a phase controller configured to control a phase of a light propagating through the arm waveguide by applying a voltage to the Mach-Zehnder modulator,
    wherein when the voltage is deviated from a predetermined range, the phase controller shifts the voltage in a direction opposite to a direction of the deviation from the predetermined range by an amount corresponding to a change of 2π in the phase.

2. The optical transmitter according to claim 1, wherein the Mach-Zehnder modulator includes two arm waveguides,
    a first electrode is provided in each of the two arm waveguides,
    the phase controller controls a phase of the light by applying a third voltage that is a sum of a first voltage and a second voltage to one of the first electrodes, and applying a fourth voltage that is a difference between the first voltage and the second voltage to another of the first electrodes, and
    when the second voltage is deviated from the predetermined range, the phase controller shifts the second voltage by the amount corresponding to the change of 2π in the phase of the light.

3. The optical transmitter according to claim 1, wherein the phase controller adjusts a phase difference between lights propagating through the two arm waveguides to π or a value equivalent to π, or 0.5π or a value equivalent to 0.5π.

4. The optical transmitter according to claim 1, wherein the predetermined range of the voltage is equal to or wider than a range corresponding to a range of the phase from −π to π, and equal to or narrower than a range corresponding to a range of the phase from −3π to 3π.

5. The optical transmitter according to claim 1, further comprising:
    a shutter configured to block a light emitted from the Mach-Zehnder modulator;

a shutter controller configured to control opening and closing of the shutter;

a modulation controller configured to modulate the light propagating through the arm waveguide in the Mach-Zehnder modulator; and a first unit and a second unit, each of which includes the Mach-Zehnder modulator and the shutter;

wherein when the modulation controller modulates the light in the Mach-Zehnder modulator of the first unit, and the voltage applied to the Mach-Zehnder modulator of the first unit by the phase controller is deviated from the predetermined range, the modulation controller modulates the light in the Mach-Zehnder modulator of the second unit, and the phase controller applies a voltage derived in the same manner as the voltage applied to the Mach-Zehnder modulator of the first unit to the Mach-Zehnder modulator of the second unit, the shutter controller closes the shutter of the first unit and opens the shutter of the second unit after the phase controller applies the voltage to the Mach-Zehnder modulator of the second unit, and the phase controller shifts the voltage by the amount corresponding to the change of $2\pi$ in the phase of the light propagating through the Mach-Zehnder modulator of the first unit after the shutter of the first unit is closed.

6. A method for controlling an optical transmitter, comprising:

controlling a phase of a light propagating through an arm waveguide by applying a voltage to a Mach-Zehnder modulator having the arm waveguide; and when the voltage is deviated from a predetermined range, shifting the voltage in a direction opposite to a direction of the deviation from the predetermined range by an amount corresponding to a change of $2\pi$ in the phase.

7. A non-transitory computer-readable medium having stored therein a program for causing a computer to execute a process, the process comprising:

controlling a phase of a light propagating through an arm waveguide by applying a voltage to a Mach-Zehnder modulator having the arm waveguide; and when the voltage is deviated from a predetermined range, shifting the voltage in a direction opposite to a direction of the deviation from the predetermined range by an amount corresponding to a change of $2\pi$ in the phase.

* * * * *